United States Patent
Kim et al.

(10) Patent No.: US 10,382,299 B2
(45) Date of Patent: Aug. 13, 2019

(54) DATA PROCESSING APPARATUS

(71) Applicant: LSIS CO., LTD., Gyeonggi-do (KR)

(72) Inventors: Pil-Suk Kim, Gyeonggi-do (KR);
Jae-Hyung Lee, Gyeonggi-do (KR);
Jae-Hong Cha, Gyeonggi-do (KR);
Ho-Young Kang, Gyeonggi-do (KR)

(73) Assignee: LSIS CO., LTD., Anyang-Si, Gyeonggi-Do (KR)

( * ) Notice: Subject to any disclaimer, the term of this patent is extended or adjusted under 35 U.S.C. 154(b) by 133 days.

(21) Appl. No.: 15/249,296

(22) Filed: Aug. 26, 2016

(65) Prior Publication Data

US 2017/0063655 A1 Mar. 2, 2017

(30) Foreign Application Priority Data

Sep. 2, 2015 (KR) .......................... 10-2015-0124508

(51) Int. Cl.
G06F 15/173 (2006.01)
H04L 12/26 (2006.01)
G06Q 10/06 (2012.01)
G06Q 10/00 (2012.01)

(52) U.S. Cl.
CPC ............ *H04L 43/08* (2013.01); *G06Q 10/06* (2013.01); *G06Q 10/20* (2013.01); *H04L 43/04* (2013.01)

(58) Field of Classification Search
CPC ......... H04L 43/08; H04L 43/04; H04L 12/26; G06Q 10/06; G06Q 10/20
See application file for complete search history.

(56) References Cited

U.S. PATENT DOCUMENTS

| 5,600,799 A * | 2/1997 | Young ................... H04L 12/433 370/419 |
|---|---|---|
| 6,697,810 B2 * | 2/2004 | Kumar ................ G06F 11/0709 |
| 7,944,868 B2 | 5/2011 | Kokku et al. |
| 2003/0137194 A1 * | 7/2003 | White ....................... B60L 3/12 307/10.1 |
| 2004/0133593 A1 * | 7/2004 | Pathak .................. G06Q 10/06 |
| 2005/0138111 A1 * | 6/2005 | Aton ................... G06F 11/3476 709/201 |
| 2007/0050777 A1 * | 3/2007 | Hutchinson ......... G06F 11/0709 718/104 |

(Continued)

FOREIGN PATENT DOCUMENTS

| CN | 1531811 A | 9/2004 |
|---|---|---|
| CN | 102187337 A | 9/2011 |

(Continued)

OTHER PUBLICATIONS

European search report dated Jan. 25, 2017 for corresponding EP application No. 16183004.7.

(Continued)

*Primary Examiner* — Benjamin M Thieu
(74) *Attorney, Agent, or Firm* — K&L Gates LLP

(57) ABSTRACT

In some embodiments, a data processing apparatus includes a communications unit configured to collect data items from data acquisition apparatuses and transmit the collected data items to clients; and a control unit configured to determine event data from among the collected data items, select the determined event data, compare the selected event data with reference event data to transmit only event data that meets predetermined conditions to the clients.

5 Claims, 5 Drawing Sheets

(56) References Cited

U.S. PATENT DOCUMENTS

| | | | |
|---|---|---|---|
| 2010/0082805 A1* | 4/2010 | Orton | H04L 12/40 |
| | | | 709/224 |
| 2010/0114994 A1* | 5/2010 | Huang | G06F 17/2247 |
| | | | 707/811 |
| 2010/0299703 A1* | 11/2010 | Altman | H04H 60/04 |
| | | | 725/48 |
| 2011/0004446 A1 | 1/2011 | Dorn et al. | |
| 2012/0087640 A1* | 4/2012 | Kitamura | G11B 27/034 |
| | | | 386/281 |
| 2013/0060921 A1* | 3/2013 | Gadhia | G06Q 30/0251 |
| | | | 709/220 |
| 2013/0203359 A1* | 8/2013 | Seiler | H04Q 9/00 |
| | | | 455/67.11 |
| 2013/0345888 A1 | 12/2013 | Forbes, Jr. | |
| 2014/0025321 A1* | 1/2014 | Spanier | G01R 21/133 |
| | | | 702/62 |
| 2014/0129688 A1* | 5/2014 | Asenjo | H04L 43/0817 |
| | | | 709/221 |
| 2016/0050356 A1* | 2/2016 | Nalepka | H04N 5/23203 |
| | | | 348/148 |

FOREIGN PATENT DOCUMENTS

| | | | |
|---|---|---|---|
| JP | 2010-512065 A | 4/2010 | |
| JP | 2013-134603 A1 | 7/2013 | |
| KR | 20140013224 A | 2/2014 | |
| KR | 20140-029064 A | 3/2014 | |
| KR | 20140111174 A | 4/2014 | |
| KR | 20150071819 A | 6/2015 | |
| WO | 0169329 A2 | 9/2001 | |
| WO | 02084946 A2 | 10/2002 | |
| WO | WO-2013069078 A1 * | 5/2013 | ....... G06F 17/30303 |

OTHER PUBLICATIONS

Chinese Office Action for related Chinese Application No. 201610709755.8; action dated Feb. 2, 2019; (6 pages).

Korean Office Action for related Korean Application No. 10-2015-0124508; action dated Apr. 5, 2019; (5 pages).

* cited by examiner

DATA PROCESSING APPARATUS

CROSS REFERENCE TO RELATED APPLICATIONS

This application claims the benefit of Korean Patent Application No. 10-2015-0124508, filed on Sep. 2, 2015, entitled "APPARATUS FOR PROCESSING OF DATA", which is hereby incorporated by reference in its entirety.

BACKGROUND

Technical Field

The present disclosure relates to a data processing apparatus.

Description of the Related Art

A remote management system may include apparatuses for acquiring and collecting data, a server and a client. Typically, a remote management system collects data from apparatuses for acquiring data and stores the data in a database of a server in real-time, and a client checks and manages the data stored in the database.

That is, a client continuously requests data collected and stored in the database of the server to check it. In addition, the client monitors the data to carry out alarm processing, data processing, control processing, history processing, etc.

As a result, time and cost are consumed for continuously monitoring the server and from collecting data.

SUMMARY

It is an aspect of some embodiments of the present disclosure to provide a data processing apparatus capable of effectively processing data collected from a power system.

It is another aspect of some embodiments of the present disclosure to provide a data processing apparatus capable of reducing load on a client.

It is yet another aspect of some embodiments of the present disclosure to provide a data processing apparatus capable of checking data acquired by data acquisition apparatuses to select optimal data to be transmitted to a client.

In accordance with one aspect of some embodiments of the present disclosure, a data processing apparatus includes a communications unit configured to collect data items from data acquisition apparatuses and transmit the collected data items to clients; and a control unit configured to determine event data from among the collected data items, select the determined event data, compare the selected event data with reference event data to transmit event data that meets conditions to the clients.

DETAILED DESCRIPTION

Figure 1:
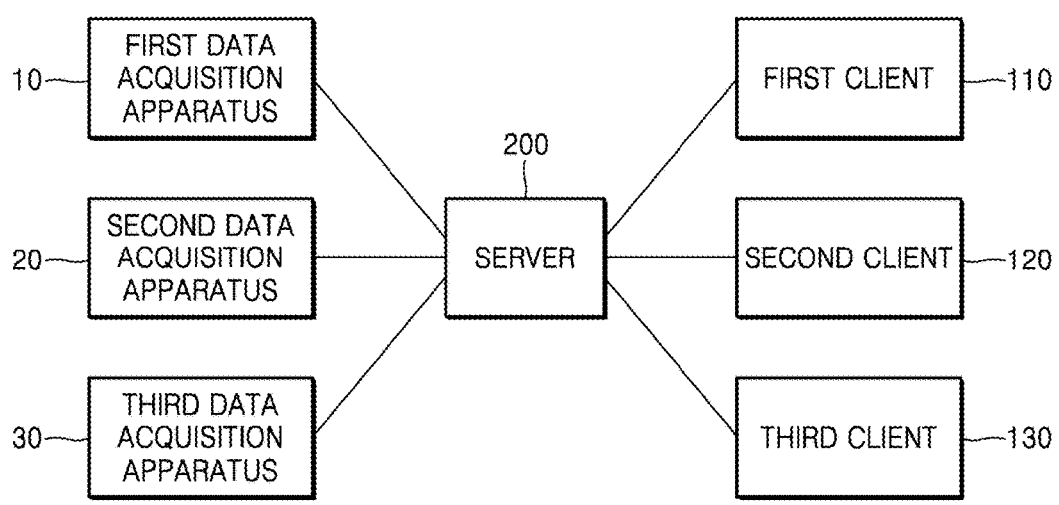
FIG. 1 is a block diagram of a power management system according to an embodiment of the present disclosure.

Advantages and features of the present disclosure and methods to achieve them will become apparent from the descriptions of embodiments herein below with reference to the accompanying drawings. However, the present disclosure is not limited to embodiments disclosed herein but may be implemented in various different ways. The embodiments are provided for making the disclosure of the present disclosure thorough and for fully conveying the scope of the present disclosure to those skilled in the art. It is to be noted that the scope of the present disclosure is defined solely by the claims. Like reference numerals denote like elements throughout the descriptions.

Detailed descriptions of well-known functions and structures incorporated herein will be omitted to avoid obscuring the subject matter of the present disclosure. Further, terms or words used in the specification and claims shall not be construed merely in a conventional and dictionary definition but shall be construed in a meaning and concept corresponding to the technical idea of the present disclosure based on the principle that an inventor is allowed to properly define the concepts of terms in order to describe his or her disclosure in the best way. Therefore, the terms, such as those defined in commonly used dictionaries, should be interpreted as including a meaning that is consistent with their meaning in the context of the relevant art and/or the present application.

Figure 2:
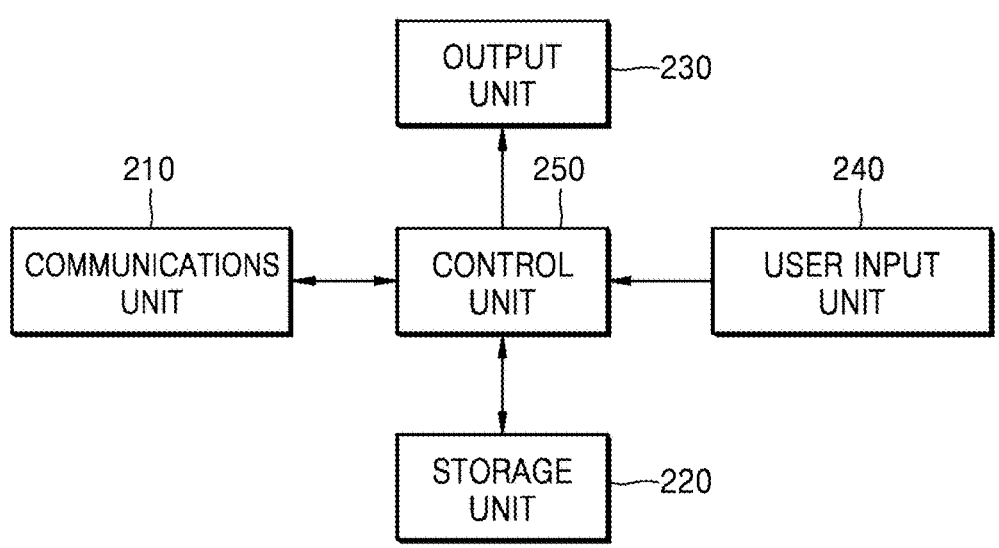
FIG. 2 is a block diagram of a server according to another embodiment of the present disclosure.

FIG. 1 is a block diagram of a power management system according to an embodiment of the present disclosure. FIG. 2 is a block diagram of a server according to an embodiment of the present disclosure.

Referring to FIGS. 1 and 2, the power management system according to the embodiment of the present disclosure may include data acquisition apparatuses 10, 20 and 30, a server 200 and clients 110, 120 and 130.

The data acquisition apparatuses 10, 20 and 30 may monitor and collect data via the server 200. The data acquisition apparatuses 10, 20 and 30 may be remote terminal units (RTUs) or sensors.

Although three data acquisition apparatuses 10, 20 and 30 are described in this embodiment of the present disclosure, more or less than three data acquisition apparatuses may be disposed depending on the type of the data to be acquired or the apparatuses.

In addition, the data acquisition apparatuses 10, 20 and 30 may transmit the acquired data to the server 200 and may monitor and manage it via the server 200.

The server 200 may collect data items from the data acquisition apparatuses 10, 20 and 30 in real-time or periodically to manage and control it.

The server 200 may include a communications unit 210, a storage unit 220, an output unit 230, a user input unit 240, and a control unit 250.

The communications unit 210 may include one or more modules that enable communications between the data acquisition apparatuses 10, 20 and 30 or the clients 110, 120 and 130. The communications unit 210 may collect data items from the data acquisition apparatuses 10, 20 and 30 and may transmit the acquired data items to the clients 110, 120 and 130 under the control of the control unit 250.

The storage unit 220 may store a program for operation of the server 200 therein and may temporally store input/output data therein. The data items stored in the storage unit 220 are monitored by the control unit 250, and the storage unit 220 may store reference information to determine the data items as event or alarm processing data therein. The storage unit 220 may store information on the data acquisition apparatuses 10, 20 and 30 which acquire data items and information on the clients 110, 120 and 130 to which the acquired data items are transmitted.

The storage unit 220 may include at least one storage medium of: a flash memory, a hard disk memory, a multimedia card micro type storage medium, a card type memory (for example, an SD or XD memory or the like), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk.

The output unit 230 generates a visual or audible output, for example, and may include a display, a sound output module, etc.

The display may include at least one of: a liquid crystal display (LCD), a thin film transistor-liquid crystal display (TFT LCD), an organic light-emitting diode (OLED), a flexible display, and a three-dimensional (3D) display.

The display may present collected data or may present a variety of information pieces such as event information and user reference information included in the data along with the data.

The sound output module may output audio signals associated with functions performed by the server 200. Information on the acquired data items received from the data acquisition apparatuses 10, 20 and 30, event alarm information included in the data items, or information notifying the clients 110, 120 and 130 of data transfer may be output as audio signals. The sound output module may include a speaker, a buzzer, and the like.

The user input unit 240 generates input data that is used by a user to control the operation of the server 200. The user input unit 240 may include a keypad, a dome switch, a touch pad, a jog wheel, a jog switch, etc.

The user input unit 240 may monitor the data items received from the data acquisition apparatuses 10, 20 and 30 and may receive reference data for event processing or alarm processing.

Normally, the control unit 250 controls the overall operation of the server 200. The control unit 250 may collect data items from the data acquisition apparatuses 10, 20 and 30 connected to the server 200 in real-time or periodically and may generate the collected data as data for event processing or alarm processing based on the predetermined reference. In addition, the control unit 250 may transmit the collected or processed data items to a predetermined client. The control unit 250 may transmit the collected or processed data items to the clients 110, 120 and 130 periodically or whenever an event is detected.

The clients 110, 120 and 130 may receive the acquired data from the data acquisition apparatuses 10, 20 and 30 from the server 200 at predetermined time points or periodically. More than one clients 110, 120 and 130 may be connected to the server 200 depending on the type of data or devices. The clients 110, 120 and 130 may be devices capable of checking and processing data such as terminals, PCs, etc.

In this embodiment of the present disclosure, the server 200 transmits data to the clients 110, 120 and 130 at predetermined time points or periodically. In addition, the server 200 may store collected data and may transmit the data to the clients 110, 120 and 130 at a predetermined time interval. Further, the server 200 may count the number data items are collected and may transmit the data items to the clients 110, 120 and 130 if the number reaches a predetermined number.

Hereinafter, data processing operations performed by the server in conjunction with the components of the power system described above will be described in detail.

Figure 3:
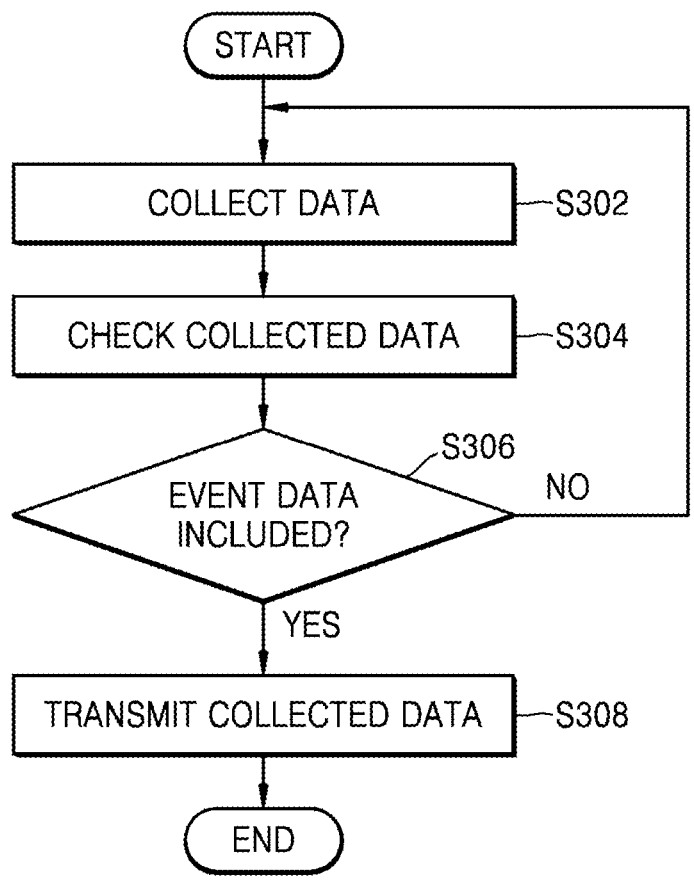
FIG. 3 is a flowchart for illustrating data processing operations according to a first embodiment of the present disclosure.

FIG. 3 is a flowchart for illustrating data processing operations according to a first embodiment.

Referring to FIG. 3, the control unit 250 according to the embodiment may receive and collect data items from the data acquisition apparatuses 10, 20 and 30 in real-time or periodically (step S302).

The control unit may check the collected data (step S304).

The control unit 250 may check the collected data items and may determine whether there is an event associated with any of the checked data items ("event data") based on a predetermined reference. The event data may contain information on an error or accident occurring in the data acquisition apparatuses 10, 20 and 30 or devices connected to the data acquisition apparatuses 10, 20 and 30. In addition, if any of the collected data items indicates that the operating status of a device connected to the data acquisition apparatuses 10, 20 and 30 is not detected, the data may be defined as the event data In addition, if any of the collected data items includes a value or a range out of a predetermined range, the data may be defined as the event data. The event data may include a variety of data values or statuses depending on a predetermined reference.

The control unit 250 may determine whether there is event data among the checked data (step S306). In addition, if it is determined that the data meeting the conditions of event data listed above is included in the collected data items, the control unit 250 may transmit the collected data items to the clients 110, 120 and 130. In particular, when the control unit 250 transmits the collected data items including the even data to the clients 110, 120 and 130, previous and subsequent data items may also be transmitted to the clients 110, 120 and 130 together with the event data. Alternatively, only the detected event data may be transmitted to the clients 110, 120 and 130.

Figure 4:
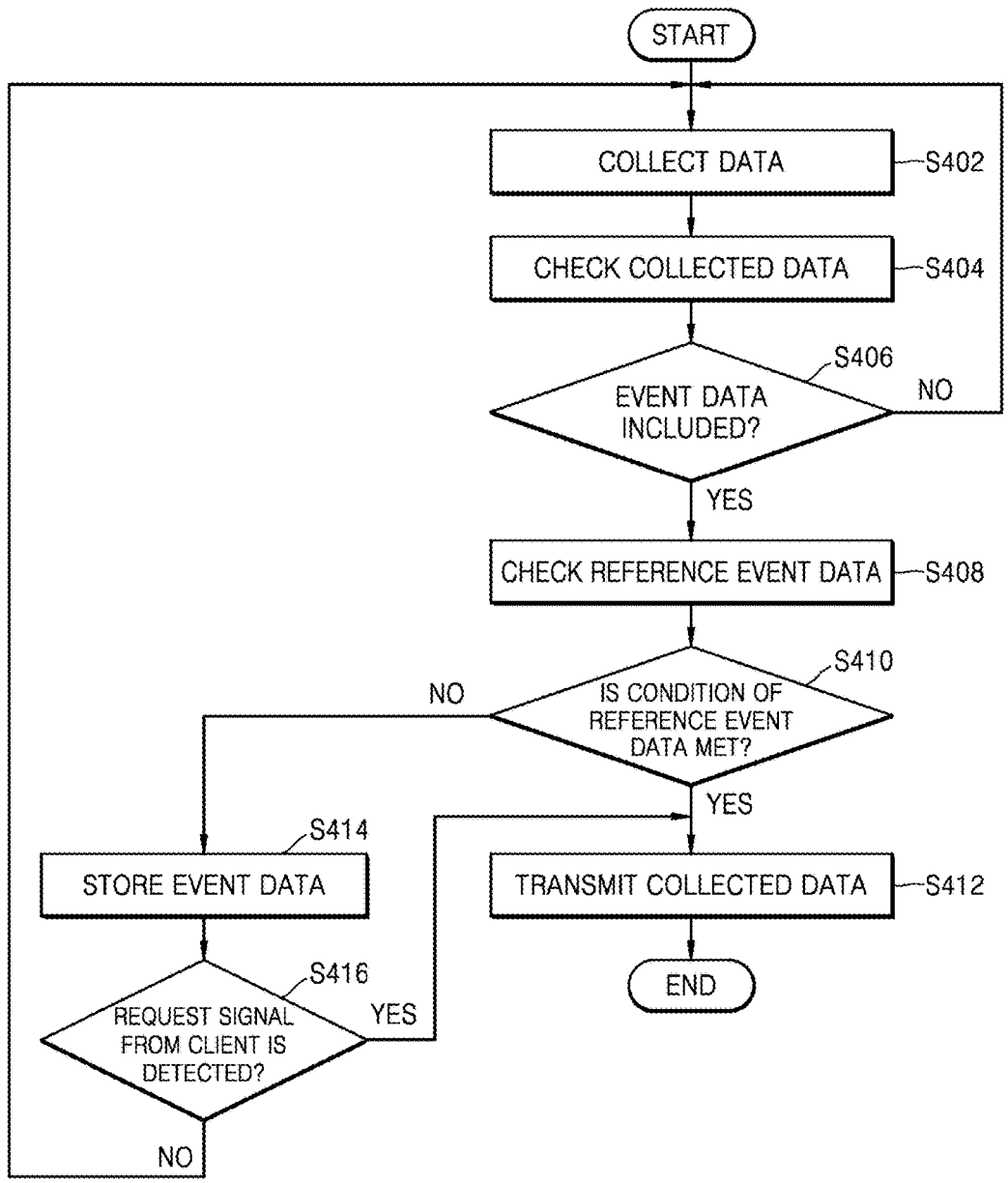
FIG. 4 is a flowchart for illustrating data processing operations according to a second embodiment of the present disclosure.

FIG. 4 is a flowchart for illustrating data processing operations according to a second embodiment.

Referring to FIG. 4, the control unit 250 according to the embodiment may receive and collect data items from the data acquisition apparatuses 10, 20 and 30 in real-time or periodically (step S402).

The control unit 250 may check the collected data (step S404).

The control unit 250 may check the collected data items and may determine whether there is an event associated with any of the checked data items based on a predetermined reference. The event data may contain information on an error or accident occurring in the data acquisition apparatuses 10, 20 and 30 or devices connected to the data acquisition apparatuses 10, 20 and 30. In addition, if any of the collected data items indicates that the operating status of a device connected to the data acquisition apparatuses 10, 20 and 30 is not detected, the data may be defined as the event data. In addition, if any of the collected data items includes a value or a range out of a predetermined range, the data may be defined as the event data. The event data may include a variety of data values or statuses depending on a predetermined reference (step S406).

The control unit 250 may determine whether there is event data among the checked data (step S460). In addition, if it is determined that the data meeting the conditions of event data listed above is included in the collected data items, the control unit 250 may determine whether to transmit the event data to the clients based on reference event data (step S408).

Specifically, the control unit 250 may compare the checked event data with the reference event data. The reference event data is used to determine whether to transmit event data to the clients. The reference event data may include a first condition for selecting event data, as well as a second condition for determining the even data is to be transmitted to the clients. In the case where the collected data items are power data items, for example, ones among the data items that meet the first condition are selected as event data. Then, the event data is compared with the reference event data, to determine whether it meets the second condition. In this manner, the event data to be transmitted to the clients may be chosen from among the collected data items, which meets both of the first and second conditions. Preferably, the first condition may be used to select event data. The second condition may be numerical data such as amount, level, value or a user setting value (condition) used to determine event data to be transmitted to the clients.

The this end, the control unit 250 may check if there is reference event data among the event data items. If it is determined that there is event data within the reference event data, the control unit 250 may transmit the collected data items or the even data to the clients (step S412). On the other hand, if it is determined that there is no event data that meets the condition of the reference event data, the control unit 250 may store the collected data items and the even data items in the storage unit 220 (step S414). The stored data items may be transmitted to the clients at a predetermined time interval, at predetermined time points or upon a request from a client (step S416).

Figure 5:
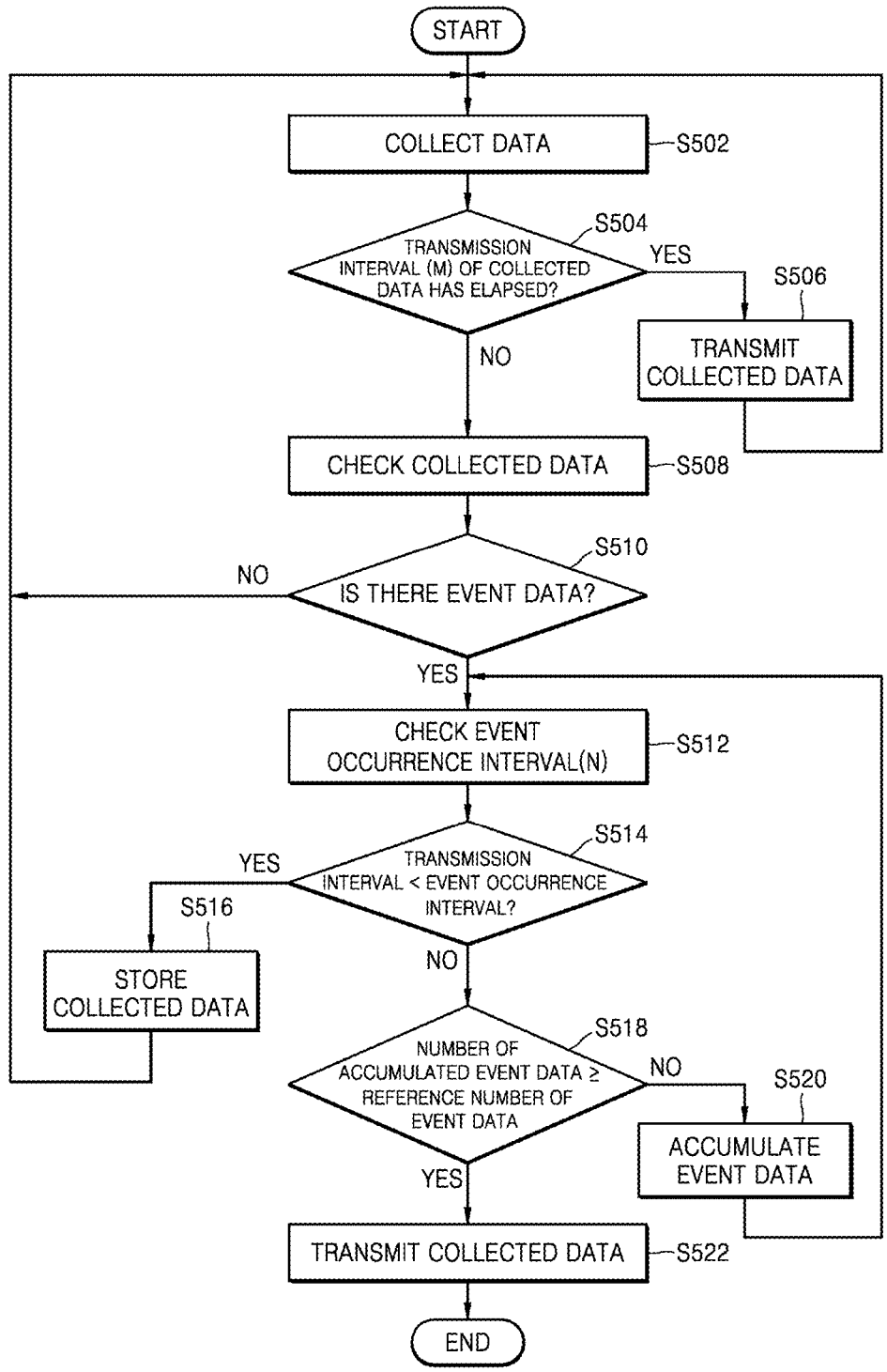
FIG. 5 is a flowchart for illustrating data processing operations according to a third embodiment of the present disclosure.

FIG. 5 is a flowchart for illustrating data processing operations according to a third embodiment.

Referring to FIG. 5, the control unit 250 according to the embodiment may receive and collect data items from the data acquisition apparatuses 10, 20 and 30 in real-time or periodically (step S502).

The control unit 250 may determine whether an interval M has elapsed at which the collected data items are transmitted to clients 110, 120 and 130 (step S504). Specifically, the control unit 250 may transmit the data collected from the data acquisition apparatuses 10, 20 and 30 to the clients periodically. Accordingly, the control unit 250 may check when the acquired data is transmitted to the clients.

If it is determined by the checking that the interval M has elapsed, the control unit 250 may transmit the collected data items to the clients (step S506)

On the other hand, if it is determine that the period M has not elapsed yet, the control unit 250 may check the collected data items (step S508).

The control unit 250 may check the collected data items and may determine whether an event has occurred based on a predetermined interval for the checked data items. The event data may contain information on an error or accident occurring in the data acquisition apparatuses 10, 20 and 30 or devices connected to the data acquisition apparatuses 10, 20 and 30. In addition, if any of the collected data items indicates that the status of a device connected to the data acquisition apparatuses 10, 20 and 30 is not detected or if any of the collected data items includes a value or a range out of a predetermined range, the data may be defined as the event data. The event data may include a variety of data values or statuses depending on a predetermined reference.

The control unit 250 may determine whether there is event data among the checked data items (step S510). If it is determined that there is event data, the control unit 250 may check the event occurrence interval N of the event data (step S512). Specifically, the control unit 250 may check whether there is event data among the checked data items and, if so, may check the event occurrence interval of the event data among the collected data items.

The control unit 250 may determine whether the event occurrence interval N of the checked event data exceeds the interval M of the collected data items (step S514). That is, the control unit 250 may determine whether the interval M comes earlier than the event occurrence interval N.

If the during N is longer than the interval M, the control unit 250 stores the event data until the interval M (step S516).

On the other hand, if the event occurrence interval N comes earlier than the interval M, the control unit 250 may count the number of accumulated event data. Specifically, the control unit 250 may determine whether the number of event data occurring within the interval M is equal to or larger than a reference number (step S518).

If the number of event data that includes a event occurrence interval N shorter than the interval M is below the reference number, the control unit 250 continue to store event data (step S520).

On the other hand, if the number of accumulated data items is equal to or larger than the reference number, the control unit 250 may transmit the event data items to the clients 110, 120 and 130 (step S522).

As set forth above, the data processing apparatus according to the embodiment of the present disclosure collects data items acquired by data acquisition apparatuses and transmits only highly reliable data to clients, such that data can be monitored more efficiently and data processing load by the clients can be reduced.

As set forth above, the data processing apparatus according to the embodiment of the present disclosure collects data items acquired by data acquisition apparatuses and transmits only highly reliable data to clients, such that data can be monitored more efficiently and data processing load by the clients can be reduced.

References to "one embodiment" or "an embodiment" do not necessarily refer to the same embodiment, although they may. Further, a particular feature, structure, effect in an embodiment may be practiced in other embodiments by combining or modifying them by those skilled in the art. Accordingly, it is to be understood that such combinations and modifications also fall within the scope of the present disclosure. Various components illustrated in the figures may be implemented as hardware and/or software and/or firmware on a processor, ASIC/FPGA, dedicated hardware, and/or logic circuitry. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. A data processing apparatus comprising:
a communications unit configured to collect data items from one or more data acquisition devices and to transmit the collected data items to one or more clients; and
a control unit configured to determine event data from among the collected data items, to select the determined event data, to compare the selected event data with reference event data, and to transmit event data that meet predetermined conditions to the one or more clients,
wherein the control unit is further configured to:
select event data from the collected data items that meet a first condition and compare the event data with the reference event data including a second condition,
transmit the event data that meet the second condition to the one or more clients and store the event data that do not meet the second condition in a storage unit,
count the number of the event data stored in the storage unit, and
transmit the event data stored in the storage unit to the one or more clients when the counted number reaches a predetermined number,
wherein the control unit is further configured to:
compare an event occurrence interval of the determined event data with a transmission interval when the collected data items are transmitted to the one or more clients,
check a number of event data items accumulated during the transmission interval if the event occurrence interval is shorter than the transmission interval, and
transmit the event data items to the one or more clients if the number of the event data items is equal to or larger than a reference number,
wherein the event data comprises the collected data items containing information on an error or accident occurring in the data acquisition devices or devices connected to the data acquisition devices, the collected data items indicating that the operating status of a device connected to the data acquisition devices is not detected and the collected data items having a value or a range out of a predetermined range, and
wherein the second condition includes a user set value, amount, or level.

2. The apparatus of claim 1, wherein the control unit is further configured to
check the collected data items for collected data items that are not transmitted to the one or more clients.

3. The apparatus of claim 1, wherein the control unit is further configured to transmit the event data to the one or more clients if the event occurrence interval is shorter than the transmission interval.

4. The apparatus of claim 1, wherein the control unit is further configured to select the event data from among the collected data items based on information on a status or an acquired value of the one or more data acquisition devices.

5. The apparatus of claim 1, wherein the control unit, upon detecting the event data, is further configured to transmit the event data along with previous data and subsequent data to the one or more clients.

* * * * *